US009605710B2

(12) United States Patent
Hassel et al.

(10) Patent No.: US 9,605,710 B2
(45) Date of Patent: Mar. 28, 2017

(54) METHOD AND DEVICE FOR THE EARLY DETECTION OF THE DEVELOPMENT OF DAMAGE IN A BEARING

(75) Inventors: Jörg Hassel, Erlangen (DE); Carsten Probol, Buckenhof (DE); Hans Tischmacher, Lauf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1122 days.

(21) Appl. No.: 13/582,251

(22) PCT Filed: Mar. 1, 2010

(86) PCT No.: PCT/EP2010/001259

§ 371 (c)(1),
(2), (4) Date: Oct. 17, 2012

(87) PCT Pub. No.: WO2011/107110

PCT Pub. Date: Sep. 9, 2011

(65) Prior Publication Data

US 2013/0066566 A1 Mar. 14, 2013

(51) Int. Cl.
*G01D 3/00* (2006.01)
*F16C 19/52* (2006.01)
*G01D 3/08* (2006.01)

(52) U.S. Cl.
CPC .............. *F16C 19/52* (2013.01); *G01D 3/08* (2013.01); *G01D 3/00* (2013.01)

(58) Field of Classification Search
CPC .. G01D 3/00; G01D 3/02; G01D 3/08; G01D 3/022; G01D 11/02; G01D 3/021;
(Continued)

(56) References Cited

U.S. PATENT DOCUMENTS 5,477,730 A 12/1995 Carter
5,495,168 A * 2/1996 de Vries ................ G01R 13/32
324/121 R (Continued)

FOREIGN PATENT DOCUMENTS

CA 2208121 A1 * 12/1998
CN 1695065 A 11/2005

(Continued)

OTHER PUBLICATIONS

Muetze et al., Experimental Evaluation of the Endangerment of Ball Bearings due to Inverter-Induced Bearing Currents. IEEE 2004.*

(Continued)

*Primary Examiner* — Sujoy Kundu
*Assistant Examiner* — Lynda Dinh
(74) *Attorney, Agent, or Firm* — Henry M. Feiereisen LLC.

(57) ABSTRACT

A method for early detection of developing damage in a bearing caused by flow of a bearing current includes evaluating a long-term measurement of a measured variable representative of a bearing current amplitude of a bearing current during a bearing operation, representing—based on the evaluation—measurement results in form of a histogram which displays a number of bearing currents per time interval in each interval of the bearing current amplitude, and evaluating the histogram representation of the measurement results through pattern comparison. A device for carrying out the method is also disclosed.

12 Claims, 2 Drawing Sheets

Method for diagnosing motors by measuring bearing currents

(58) Field of Classification Search
CPC .......... G01D 3/036; G01R 1/10; G01R 11/12; G06F 17/18; F16C 19/52
USPC ...................................................... 702/34–35
See application file for complete search history.

(56) References Cited

U.S. PATENT DOCUMENTS

| | | | | |
|---|---|---|---|---|
| 2008/0141072 | A1 | 6/2008 | Baybutt | |
| 2011/0169504 | A1* | 7/2011 | Pekola .............. | G01R 31/1263 324/629 |

FOREIGN PATENT DOCUMENTS

| | | | |
|---|---|---|---|
| CN | 101405611 | A | 4/2009 |
| DE | 100 65 314 | A1 | 7/2002 |
| DE | 102005027670 | A1 | 1/2007 |
| EP | 2 053 375 | B1 | 12/2009 |
| RU | 2113699 | C1 | 6/1998 |
| SU | 1809348 | A1 | 4/1993 |
| WO | WO 00/04361 | A1 | 1/2000 |
| WO | WO 2008/116433 | A1 | 10/2008 |
| WO | WO 2008116433 | A1 | 10/2008 |
| WO | WO 2010007203 | A1 | 1/2010 |

OTHER PUBLICATIONS

Kempski et al., Bearing Current Path and Pulse Rate in PWM-Inverter-Fed Induction Motor, 2001.*

* cited by examiner

Method for diagnosing motors by measuring bearing currents

METHOD AND DEVICE FOR THE EARLY DETECTION OF THE DEVELOPMENT OF DAMAGE IN A BEARING

CROSS-REFERENCES TO RELATED APPLICATIONS

This application is the U.S. National Stage of International Application No. PCT/EP2010/001259, filed Mar. 1, 2010, which designated the United States and has been published as International Publication No. WO 2011/107110.

BACKGROUND OF THE INVENTION

In electric machines, electrical currents (bearing currents) can occur in bearings which significantly reduce the service life of said bearings. Bearing currents are electrical currents which occur in antifriction bearings or sliding bearings of electric machines.

They are caused by electrical voltages (bearing voltages) which are produced on account of electrical or magnetic stray fields inside the machine or as a result of interference currents which, originating externally, flow by way of the machine. As soon as the bearing voltage exceeds the breakdown voltage (fretting voltage) of the lubricating film, the current flow takes place.

The negative effects of bearing currents are for example fat burning (reduction in the residual lubricating capacity) crater formation in the track and the rolling elements and in an extreme case: ripple formation in the tracks. The ripples are oriented perpendicular to the track.

These bearing currents are a phenomenon which has been known for decades and lead to a considerable demand on resources on the part of users or to high warranty-related costs for manufacturers. There is therefore a great interest in a measuring method or in sensors which can measure bearing currents and evaluate them in a meaningful manner.

Bearing currents on electric machines, in particular in regard to operation with power electronics, can reduce the service life of the motor bearings manyfold. According to the current prior art, bearings damaged by electrical bearing currents are noticed and replaced only when they become conspicuous, e.g. as a result of noise development or burnt bearing grease. This often leads to installation downtimes resulting in enormous costs.

A major problem in regard to operation of the bearing is therefore to recognize the anticipated point in time at which failure will occur and thus determine the optimum point in time for bearing replacement. In the case of too early a reaction this results in unnecessarily high maintenance costs, while too late a reaction means installation downtime costs for the user.

The diagnosis of the cause and assessment of solutions are dealt with at the present time on the basis of short-term bearing current measurements or vibration analyses. The validity of said measurements is limited by taking into consideration individual measurements from a period of time typically limited temporally to a few days and moreover originating from different specialists. Changes in influencing factors such as the grounding system or faults in the grounding system which occur before or after the measurements cannot be determined herewith, for example.

Previous test beds for bearing currents have hardly produced any findings relating to the prevention of damage resulting from bearing currents on account of their focus on electrical variables or vibration analyses. The same also applies in the case of measurements taken in the field. A correlation between electrical measurement and vibration measurement is not possible due to the fact that no time stamp can be recorded. Time differences are caused by the different measurement systems.

Considerable costs are often associated with remedial measures against bearing currents and the bearing damage caused thereby and it is also only possible with difficulty to evaluate the extent to which said measures will be adequate. In the past, high-cost measures have in part nevertheless not yielded the desired result.

The object of the invention is to specify a solution for the aforementioned problems. A measuring method and a device should be specified, said method allowing the bearing currents to be better evaluated in regard to potential damage to the affected bearing. Furthermore, a method and a device should be specified, said method being suitable for analyzing the cause of a damaging bearing current.

This object is achieved by a method for the early detection of the development of damage in a bearing caused by the flow of a bearing current with the following steps: measuring during ongoing bearing operation at least one variable representative of a bearing current amplitude of a bearing current, evaluating at least one long-term measurement of the at least one measured variable, transforming results from the at least one long-term measurement into a histogram which displays a frequency of occurrence of bearing currents as a function of the bearing current amplitude, and evaluating the measurement results by comparing patterns of histograms.

This object is furthermore achieved by a device for early detection of developing damage in a bearing caused by flow of a bearing current, with the device including an evaluation unit for evaluating at least one long-term measurement of at least one variable representative of a bearing current amplitude of a bearing current measured during ongoing bearing operation, means for transforming results from the at least one long-term measurement into a histogram which displays a frequency of occurrence of bearing currents as a function of the bearing current amplitude, and means for evaluating the measurement results by comparing patterns of histograms.

The device for the early detection of the development of damage in a bearing caused by the flow of a bearing current, comprises means for evaluating at least one long-term measurement of a measured variable which is characteristic of the occurrence of bearing currents during the bearing operation according to the bearing current amplitude, means for creating a representation of the measurement results based on the evaluation, and means for evaluating the representation by means of pattern detection.

In a first embodiment, the measurements are carried out in a bearing current test bed:

the cause of the bearing currents is ascertained by means of long-term bearing current measurements in a test bed, whereby the measuring time is at least longer than 1 ms, but measurements may also cover a period of days.

The motor bearing is subjected to electrical and mechanical loads in a defined manner, In addition to the electrical load (bearing current and voltage), the mechanical load and further parameters such as load distribution and duration or frequency range of the spark discharges are also recorded in a temporally coordinated manner, in the case of a bearing (roller bearing, ball bearing, antifriction bearing, sliding bearing) for example state of bearing grease, mechanical vibrations, temperature.

Measurement is carried out over an extended period of time (>1 hour, typically several days)

The tests are carried out in automated fashion and with temporal correlation.

The aim is to work out the relationship between the measuring methods and to use the combination and the mathematical relationship of these different physical measured values to increase the reliability of the damage analysis.

In a further embodiment, a measurement is carried out on-site on installations:

As a result of using a bearing current sensor which monitors the bearing currents "online" continuously during operation and in an advantageous embodiment also logs selected operating parameters which have been ascertained by measurement means or by way of the control device, the following additional value is generated:

A defect in the grounding system of relevance to bearing currents is identified in a timely manner before any damage occurs. As a result of measuring the vibrations of the bearing, it is then possible to reliably predict a threat of damage and to carry out repair measures at a point in time which is acceptable to the customer in terms of cost optimization.

The need for the introduction or monitoring of a bearing insulation can thus likewise be recognized. The measurement of bearing current and voltage as well as of the ground variables also leads to the detection of a defect. Examples of such a defect are a worn grounding brush or a damaged filter element.

A defect in the grounding system of relevance to bearing currents or a damaging change in the grounding system from the bearing current perspective is identified in a timely manner before any damage occurs. A threat of damage can then be predicted and repair measures carried out at a point in time which is acceptable to the customer.

On the basis of the operating parameters and the damage to the bearings, unfavorable combinations of bearing types and bearing parameters, of mechanical and electrical loads, can be recognized and avoided for further projects.

By means of a special evaluation of a representation in the form of a histogram (alternatively also bar chart) it is possible to differentiate different types of bearing currents. A knowledge of the type of the bearing currents enables targeted cost-effective remedial action.

Bearing Current Test Bed

As a result of the step from short-term measurements to long-term measurements (for example, using the measuring method described in publication DE 10 2005 027 670) and as a result of the combination with the measurement of mechanical variables, the inadequacy of the previous focus on primarily electrical variables and a relatively small number of operating states is avoided. The problem associated with previous measurements is the low informational value of bearing current measurements with reference to the threat of damage to the bearings. This is raised to a high informational value by the extended measuring method in which different physical measured variables are correlated with one another. As a result of the new method, relationships can now be unambiguously recognized and can be reliably evaluated using mathematical methods. Damage to machines can be prevented in this way by means of automated evaluations.

Measurement on-site on installations, e.g. within the framework of condition monitoring:

As a result of the on-site "online" analysis using new technology, changes affecting the grounding system or defective components in the grounding system which may have a negative effect on the bearing currents are recognized. According to previous methods, these factors would only be noticed as a result of noise or failure after damage to the bearings had occurred. The new measuring method enables a reliable statement which for example predicts the failure of e.g. the motor and is evaluated in a condition monitoring system in such a manner that a repair measure can be scheduled into the maintenance cycles. Trend analyses can also be performed which permit the detection of a deterioration in the system over the lifetime thereof and thereby enable a calculation of the potential point in time of a failure. This has positive effects on costs or availability of installations.

On the basis of histograms of the measured bearing currents it is possible to differentiate the bearing current types: EDM, circular currents and rotor ground currents. In this situation, the evaluation takes place with a knowledge of the typical histogram distributions for different bearing current types.

Both the bearing current test bed and also the online diagnosis are based on the fact that a bearing current or bearing voltage sensor is permanently installed on the motor. Further sensors for registering further electrical or non-electrical variables, e.g. vibrations, are possible.

During inverter operation, current sensors and/or voltage sensors are for example often used for the motor phases and sometimes temperature sensors in the motor winding.

In the bearing current test bed, mechanical variables such as load and load distribution in the bearing can likewise be available or selectable. Rotational speed, torque and further variables can be present in the motor control. These measured values are taken into consideration in the bearing current evaluation.

The bearing current evaluation can be performed as an independent component or integrated into the motor control.

Even without motor control—e.g. in the case of operation without frequency converter—the measurement can be carried out in accordance with the described principle. In this case, the bearing current evaluation unit communicates directly with the user interface. The user interface can also be integrated into the evaluation unit.

Should the bearing currents lie beneath a certain threshold at startup time when taking into consideration further mechanical or other parameters, the startup has been carried out successfully from the "bearing current perspective". An indication to this effect is given to the user. This indication in the user interface can be initiated indirectly by way of the motor control or directly by a bearing current evaluation unit.

If the threshold is exceeded, the startup operator can be informed in order that remedial action can be taken.

A remote diagnostic facility can similarly be integrated into the concept. To this end, the data is to be transmitted by wireless, wired, glass fiber or some other communication path. In a particularly advantageous embodiment, the user can change the type of the evaluation by means of control commands in order to refine the analyses. These are e.g. measuring range changeover, measuring filter changeover, number of measurements per second, changing the evaluation parameters such as histogram interval width in the case of statistical evaluation. An indication does not need to be restricted to a Yes/No statement. Multi-level statements right through to graphical statistical evaluations are also feasible.

BRIEF DESCRIPTION OF THE DRAWINGS

The invention will be described in the following with reference to exemplary embodiments. In the drawings.

DETAILED DESCRIPTION OF PREFERRED EMBODIMENTS

Figure 1:
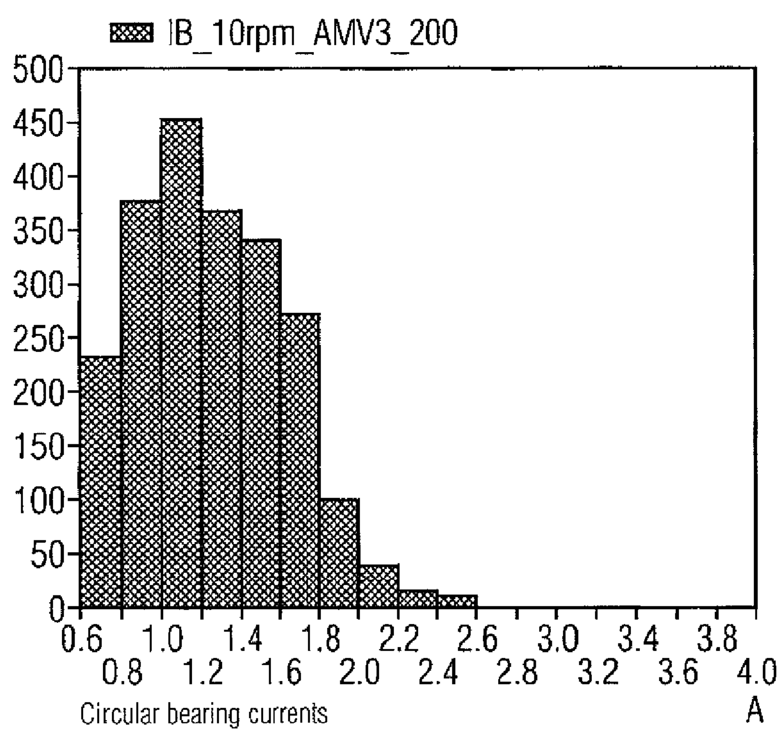
FIG. 1 shows a histogram of measured values of a bearing with circular bearing currents.

The histogram evaluations described above are illustrated in FIGS. 1 and 2. The number of bearing currents per unit time is visualized for certain bearing current amplitude intervals. In FIG. 1, for example, 450 bearing currents occur per second with amplitudes in the range 1.0 A to 1.2 A.

The circular bearing currents exhibit a histogram in accordance with FIG. 1, which drops sharply after reaching the maximum frequency of occurrence in the interval (here: 1.0-1.2 A).

Figure 2:
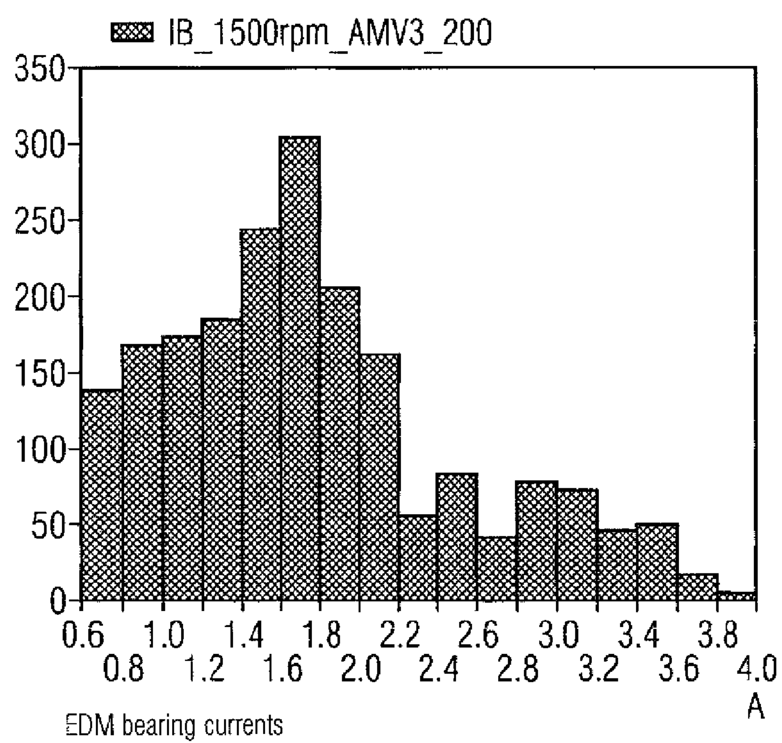
FIG. 2 shows a histogram of measured values of a bearing with EDM (electric discharge magnetic) bearing currents.

The EDM (electric discharge machining) bearing currents (in particular spark erosion) on the other hand exhibit a greater spread towards high current amplitudes, as is illustrated by way of example in FIG. 2.

The amplitudes of the measured bearing currents exhibited a significantly greater spread towards higher current amplitudes for EDM bearing currents than for the circular bearing currents. In this situation, as a result of suitable preprocessing of the measured data on the basis of the duration of the events only bearing currents with spark formation have been taken into consideration. These can be recognized for example due to the fact that only events which are faster than 20 ns are evaluated. The known remedial measures can be applied—according to the measurement results. Thus it is possible with the aid of the diagram not only to predict a threat of damage to the bearing but the behavior of the bearing in response to possible faults can also be investigated, which faults can then be eliminated, missing or defective insulation in the bearing for example.

Typical remedies are filter elements, changes in the grounding concept e.g. by altering the shield contacting, by fitting additional potential equalization conductors in the grounding system, changing line lengths, use of insulated motor bearings and shaft grounding brushes which electrically bridge the motor bearing. Incorporation in generators is likewise possible. Here too to some extent bearing currents occur which can reduce the service life of the bearings or shorten maintenance intervals. The method shows an analogous behavior in this case.

Figure 3:
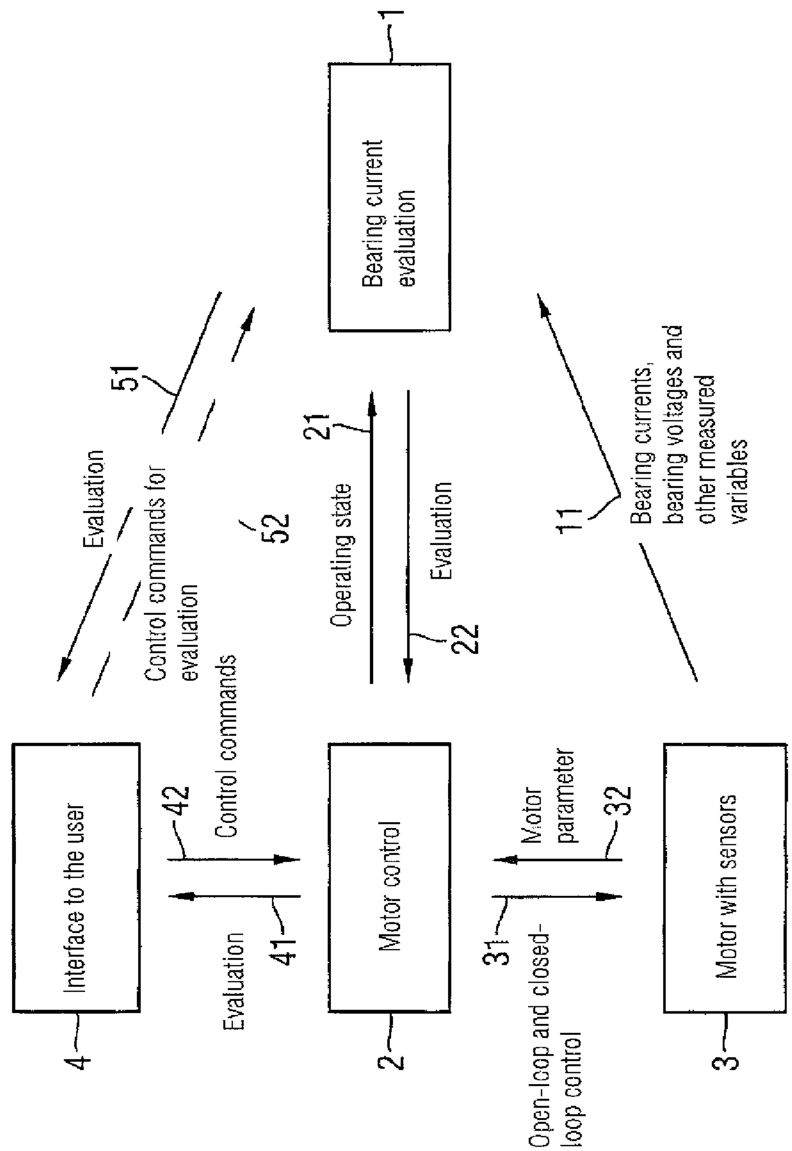
FIG. 3 shows a diagram of the method for motor diagnosis by means of bearing current measurement.

FIG. 3 shows an overview of the method according to the invention with its participating components, if applicable. A bearing current evaluation unit 1 monitors the operating state of the motor control 21 and if required reports said state back to the motor control 22. The motor control 2 itself controls 31 (in open-loop and closed-loop fashion) the motor 3 with the bearings in question and the associated sensors. In this situation, the sensors can report 11 motor parameters 32 to the motor control and measured variables in accordance with the method according to the invention (bearing currents, voltages and further measured variables) to the bearing current evaluation unit. In addition, an interface to the user 4 can be provided which is supplied with data 41 both by the motor control 2 itself and also by the bearing current evaluation unit 1. From said interface the user can if required control the motor and the evaluation unit by means of control commands 42, 52.

In addition to the startup phase, it is also advantageous to use the method in order to obtain general statements and limit values or thresholds (bearing current test bed and findings from field data concerning bearing currents, operating states and where applicable damage).

Through trend statements, variations caused by operation of the installation can be detected.

The invention claimed is:

1. A method for early detection of developing damage in a bearing of an electric motor caused by flow of a bearing current, comprising the steps of:

measuring, in a test bed and before an ongoing operation of the bearing, during a measuring time longer than 1 ms, bearing currents having a duration of faster than 20 ns with a bearing current sensor or bearing voltage sensor, or both, which are is permanently installed on a motor, wherein the bearing is subjected to predefined electrical and mechanical loads, recording, in form of a first histogram, a frequency of occurrence of bearing currents across the bearing as a function of a bearing current amplitude, differentiating based on a first characteristic pattern in the first histogram between electric discharge machining (EDM) currents, circular bearing currents and rotor ground currents, measuring, during the ongoing bearing operation, at least one variable representative of a bearing current amplitude of a bearing current having a duration of faster than 20 ns with the bearing current sensor or the bearing voltage sensor, or both, evaluating, for a measuring time longer than 1 ms, at least one long-term measurement of the at least one variable with a bearing current evaluation unit, displaying results from the at least one long-term measurement in a second histogram which displays the frequency of occurrence of bearing currents as a function of the bearing current amplitude during the ongoing bearing operation in a user interface, differentiating, based on a second characteristic pattern in the second histogram between the electric discharge machining (EDM) currents, circular bearing currents and rotor ground currents, comparing the first and second characteristic patterns of the histograms with respect to the EDM currents, and detecting the developing damage based on the comparison.

2. The method of claim 1, wherein the at least one long-term measurement is performed over a measurement time having a duration between 1 ms and one hour.

3. The method of claim 1, wherein the at least one long-term measurement is performed over a measurement time having a duration between one hour and at least one day.

4. The method of claim 1, wherein the measured variable is a variable which is characteristic of a discharge time and a discharge amplitude.

5. The method of claim 1, wherein the measured variable is a variable which is characteristic of at least one of the following features: the bearing current amplitude or a bearing voltage or a slope of the bearing voltage or at least one indirect variable selected from an electrical and an electromagnetic field.

6. The method of claim 1, wherein the at least one long-term measurement is carried out on a test bed under load.

7. The method of claim 1, wherein the long-term measurement of the bearing is carried out in a facility.

8. The method of claim 1, wherein the histogram is graphically displayed.

9. The method of claim 1, and further comprising the step of performing a trend analysis of the second characteristic pattern.

10. The method of claim 1, and further comprising the step of measuring during ongoing bearing operation at least one additional variable selected from vibrations, temperature, terminal voltage in a motor, lubrication state, and motor current.

11. The method of claim 1, wherein the measured variables are retrieved through remote access.

12. The method of claim 1, and further enabling a user to control evaluation of the at least one long-term measurement through commands changing a measuring range, a measuring filter, a measuring frequency, evaluation parameters and width of an interval of the bearing current amplitude in the histogram.

* * * * *